US006603385B2

(12) United States Patent
Kitchens

(10) Patent No.: US 6,603,385 B2
(45) Date of Patent: Aug. 5, 2003

(54) SAFETY DEVICES FOR ELECTRICAL CIRCUITS AND SYSTEMS

(75) Inventor: James L. Kitchens, Cottonwood, AZ (US)

(73) Assignee: Safety Thermal Components, Inc., Cottonwood, AZ (US)

( * ) Notice: Subject to any disclaimer, the term of this patent is extended or adjusted under 35 U.S.C. 154(b) by 128 days.

(21) Appl. No.: 09/813,055

(22) Filed: Mar. 19, 2001

(65) Prior Publication Data

US 2001/0012732 A1 Aug. 9, 2001

Related U.S. Application Data

(63) Continuation-in-part of application No. 09/196,653, filed on Nov. 19, 1998, now Pat. No. 6,204,747.

(60) Provisional application No. 60/070,996, filed on Nov. 21, 1997.

(51) Int. Cl.[7] .......................... H01H 37/76; H02H 5/04

(52) U.S. Cl. ....................... 337/407; 337/412; 337/416; 361/104

(58) Field of Search ................................ 337/158, 166, 337/227, 296, 291, 297, 401–414; 361/103, 104, 105; 29/623; 439/161

(56) References Cited

U.S. PATENT DOCUMENTS

| | | | | |
|---|---|---|---|---|
| 530,430 A | | 12/1894 | Klein | |
| 921,875 A | | 5/1909 | Newman | |
| 2,300,142 A | | 10/1942 | Wood | |
| 2,790,049 A | | 4/1957 | McAlister | |
| 3,198,914 A | | 8/1965 | Baran et al. | |
| 3,573,428 A | | 4/1971 | Dening | |
| 4,101,860 A | | 7/1978 | Fister | |
| 4,593,262 A | | 6/1986 | Krueger | |
| 4,652,848 A | | 3/1987 | Hundrieser | |
| 4,746,892 A | * | 5/1988 | Musto | 337/403 |
| 4,903,162 A | | 2/1990 | Kopelman | |
| 4,994,779 A | | 2/1991 | Douglass | |
| 5,043,689 A | | 8/1991 | Di Troia et al. | |
| 5,084,691 A | | 1/1992 | Lester et al. | |
| 5,150,093 A | | 9/1992 | Gurevich | |
| 5,272,587 A | * | 12/1993 | Wan | 361/111 |
| 5,293,296 A | | 3/1994 | Carl | |
| 5,408,244 A | | 4/1995 | Thwaites | |
| 5,424,895 A | | 6/1995 | Gaston | |
| 5,561,582 A | * | 10/1996 | Geishecker et al. | 337/29 |
| 5,590,010 A | * | 12/1996 | Ceola et al. | 337/13 |
| 5,612,662 A | | 3/1997 | Drekmeier et al. | |
| 5,627,719 A | | 5/1997 | Gaston | |
| 5,742,464 A | | 4/1998 | Ceola et al. | |
| 5,770,993 A | | 6/1998 | Miyazawa et al. | |
| 5,783,986 A | * | 7/1998 | Huang | 337/333 |
| 5,896,080 A | | 4/1999 | Chen | |
| 5,930,097 A | | 7/1999 | Ceola et al. | |

* cited by examiner

*Primary Examiner*—Jayprakash N. Gandhi
(74) *Attorney, Agent, or Firm*—Lowell W. Gresham; Jordan M. Meschkow; Charlene R. Jacobsen

(57) ABSTRACT

A protective device for minimizing fire danger in the use of electrical circuits comprises a unit having a mechanically biased conductive element in series with the circuit, and maintained in position under tension by a fusible material such as a Cerro alloy having a yield point at a selected temperature threshold. When overheating at some other point in the circuit results in a rise of temperature at the protective device, the yielding of the fusible material allows the conductive element to spring free, opening the circuit and cutting off the current. This arrangement is useful in a male plug integral to or separate from an extension cord or power cord, in conjunction with circuit breaker systems, in a in-circuit device, and in electrical appliances and devices.

19 Claims, 8 Drawing Sheets

SAFETY DEVICES FOR ELECTRICAL CIRCUITS AND SYSTEMS

CROSS-REFERENCE TO RELATED APPLICATIONS

This application is a continuation-in-part of the U.S. patent application entitled "Safety Devices For Electrical Circuits And Systems," by James L. Kitchens, Ser. No. 09/196,653, filed Nov. 19, 1998, now U.S. Pat. No. 6,204, 747, which claims the benefit under 35 U.S.C. §119(e) of the U.S. provisional application entitled "Safety Devices For Electrical Circuits And Systems," by James L. Kitchens, Serial No. 60/070,996, filed Nov. 21, 1997, both of which are hereby incorporated by reference.

FIELD OF THE INVENTION

This invention relates to systems and devices for preventing fires, and for minimizing fire danger, from overheating and overloading conditions that might arise in or affect electrical wiring in residential and commercial installations.

BACKGROUND OF THE INVENTION

Many residential and commercial fires result from causes that are generally, and sometimes inaccurately, described as faulty electrical wiring, or electrical circuit failures. One common cause of such failures is overheating of or by an extension or other power cord because of circuit overload or other conditions, separately or in combination. For example, when a temperature is reached within or outside the extension cord at which the synthetic or rubber compound insulation melts or decomposes, a heated interior wire may become exposed and come in contact with and ignite flammable material. Also, insulation failures can also allow high amperage arcing to occur between interior wires. The result is a type of fire which is known to cause loss of a number of lives and much residential and commercial structure damage each year. Electrical circuits and interconnecting cords and cables are designed to function with an expected degree of resistive heating, and to accommodate temperature buildup as heat is conducted along the circuits from one point to another. A long extension cord, for example, transfers heat along its conductive wiring from the outlet or source from which it derives current, and from an appliance or device at which electrical power is consumed. Combinations of operating factors thus can result in overheating of an extension cord, for example, and temperatures can reach a level at which decomposition begins and incipient danger exists.

Electrical codes require protection against electrical overload conditions in permanent installations by compelling inclusion of fuses or circuit breakers in the wiring system between the main power supply and the points of usage in a residential or commercial building. There are, nonetheless, a number of types of potential wiring originated fires that are not precluded by fuse or circuit breaker protection, including those mentioned above.

Although product manufacturers and electrical equipment code requirements provide instructions as to preferred and limiting conditions for use of components such as receptacles, extension cords, and circuit breakers, there can be no guarantee that users will comply with these stated instructions. Extension cords, for example, are nominally intended to carry from 1200–1600 Watts, but users may in practice drastically overload an extension cord in a number of ways. For example, there is a tendency to use extension cords and circuits beyond their rated capacities, as by attaching a cord to an appliance of higher power than is nominally permitted. At the receptacles and outlets, there is a tendency to attach multiple devices, and if too many are coupled in this, may exceed the load carrying capacity of the receptacle even though individual appliances and devices may not demand much power individually.

Special problems can arise from environmental and building conditions. For example, when exterior temperatures in a region approach or exceed 100° F., the temperature in attics, under-roof crawl spaces, and inside walls can approach considerably higher levels. In these uninsulated interior spaces the temperature can: be 40 to 60° F. higher than the outside air temperature from the sun heating the exterior surfaces, which transmit radiant energy to heat the interior spaces. Extensions and other wiring are often placed in such spaces. The insulation of such wiring can approach threshold levels merely because of extremely high ambient temperature, because of being in a confined space, or because of an increase in resistance heating caused by increased ambient temperature. The resistance of copper conductors increases by a factor of 0.0047 for each degree Celsius above zero, thus increasing resistive heating with temperature when current is constant. The effect can be compounded if multiple wires are run in the same space or, as in the case of extension cords, the wire is bundled or coiled to fit within a limited space. Under these circumstances, relatively minor overheating of lines, receptacles and/or appliances can substantially increase danger of combustion.

Extension cords or cord sets, power cords, and other electrical power distribution circuits come in a variety of configurations. One very widely used type of cord employs a type of polyvinyl chloride (PVC) insulation that permits safe operation only over a temperature range of +32 to +140° F. This widely used type of cord is at serious risk of experiencing excessive temperature due to the types of overload and ambient temperature factors discussed above. Due to the low maximum safe operating temperature of only 140° F., the user often fails to appreciate the risks involved. While other types of insulation can safely withstand wider temperature ranges, e.g., another type of insulation rated for the −58° to +221° F. temperature range is readily available, such insulation causes the cord to be significantly more expensive. Consumers apparently consider the increased expense of the higher temperature range insulation to be unjustified by the corresponding increased safety because the lower temperature rated cording enjoys tremendous commercial success. Accordingly, a need exists for an inexpensive way to improve the safety of electrical power cording, and especially the type of electrical power cording that uses insulation having a low safe operating range.

Electrical fuses protect substantially only against current overloading, as do circuit breakers. Furthermore, circuit breakers can malfunction and fail to operate. Under such conditions, they may overheat, and even if they do not themselves fail, they act as a heat source for interconnected elements in the wiring system. The larger the gauge of the copper wires used in an extension cord, for example, the more current it can carry for each degree of temperature rise. At the same time, the copper, which is an extremely good thermal conductor, becomes more efficient in transferring heat energy along its length. Consequently, there can be bi-directional interaction between different points in an electrical system, so that a fire need not necessarily arise at some point of malfunction, but may be initiated at a remote location that is in effect a weak link in the system. It is evident that protection is needed whether there is an overheating danger from causes other than electrical malfunction, or some misoperation or misuse of electrical equipment. It is obvious, furthermore, given the large installed inventory of receptacles, outlets, circuit breakers and fuses, as well as the widespread employment of semi-permanent adapter outlets and extension cords, that the patterns of usage in residential and commercial buildings will not substantially change. Consequently, the dangers inherent in many usage habits will remain unless a convenient means is found for protecting against fire danger from these causes. For these and other reasons, there is a need for compact and inexpensive safety elements which cooperate with standard electrical circuitry to protect against the types of failures in electrical wiring systems that endanger individuals and cause damage or destruction to buildings.

A few extension cords, power cords, and the like have incorporated inexpensive fuses in an attempt to improve safety at a minimal increase in expense. However, such attempts have generally been unsuccessful. Typical fuses are susceptible to nuisance tripping in response to momentary overcurrent conditions, such as normally occur when starting a motor. Such situations are considered nuisance tripping because the momentary overcurrent conditions pose no fire hazard. Moreover, traditional fuses are current, not temperature, limiting devices that fail to account for ambient temperature conditions. An amount of electrical current that is safe in a 75° F. ambient temperature may very well be unsafe in a 130° F. ambient temperature. Accordingly, a fuse which permits safe operation at a low ambient temperature is likely to allow unsafe operation at a higher ambient temperature. Alternatively, a fuse which prohibits unsafe operation when a cord operates in a higher ambient temperature is likely to experience nuisance tripping when the cord operates at lower ambient temperatures because an amount of current that is unsafe at a higher temperature may be perfectly safe at a lower temperature.

Alternatively, a fuse which prohibits unsafe operation when a cord operates in a higher ambient temperature is likely to experience nuisance tripping when the cord operates at lower ambient temperatures because an amount of current that is unsafe at a higher temperature may be perfectly safe at a lower temperature.

Time delay fuses are also available for incorporation in series with extension cords, power cords and the like. Time delay fuses could potentially limit the nuisance tripping caused by momentary overcurrent, such as motor starting. However, conventional time delay fuses are large, complex structures that would for many applications, if integrated with electrical power cording, raise the price even more than the price increase necessitated by the use of higher temperature insulation. Moreover, time delay fuses are current limiting devices that fail to account for the ambient temperature in which the extension cord, power cord, or the like is operating. Conventional time delay fuses, when connected in series with an extension cord, power cord, or the like, either experience serious nuisance tripping while adequately protecting against excessive temperature or fail to adequately protect against excessive temperature.

SUMMARY OF THE INVENTION

Systems and devices in accordance with the invention provide a heat responsive function to open a circuit when an overheating condition exists that may be wholly independent of electrical overload. They may utilize a circuit configuration in which a part of a spring-loaded element that conducts current in a circuit is physically retained in position in the circuit by a thermally responsive alloy or other joinder element. The joinder element is in a thermally conductive path with the circuit or device, and any surrounding environment, that has the potential to cause overheating. A protective device of this kind responds to some physically separate overheating condition, regardless of the source, by causing the heated joinder element to yield at a predetermined threshold, so as to release the spring-loaded circuit element and open the circuit. The threshold temperature is selected in accordance with the operating parameters of the unit of concern, such as in relation to the temperature at which the insulation of an extension cord begins to decompose or degrade. Alternatively, the threshold temperature may be chosen with respect to the permissible temperature limits for a circuit breaker or an appliance. In any event, whatever the cause, whether it is due to an environmental temperature condition that exposes bare wire in an extension cord, or an electrical malfunction, or overloading of the electrical circuits themselves, the current is cut off and the power using element and associated circuits no longer function as heat sources.

Such protective devices in accordance with the invention can be fabricated as integral parts of complete units, or they can be fabricated as separate adapters to be attached to existing installations. By this means, an adapter can be interposed between an extension cord and a wall receptacle, between an appliance and a cord, or between a wall receptacle and a multi-outlet plug to assure that the circuits do not overload or overheat due to internal or external causes.

In a more particular example of a device in accordance with the invention, a male plug for an extension or appliance cord may either be integral with a cord or in the form of a separate adapter unit. The male plug is fabricated with extending prongs at least one of which includes an interior conductive spring element and is in electrical circuit with the conductor or unit to be protected. The spring element is configured to have conductivity characteristics so that its resistive heating does not exceed that of the conductors to which it is coupled. The spring element is held under tension or compression within the completed circuit by the temperature responsive joinder material. In most instances, the temperature responsive material is a bismuth and lead-containing alloy having a melt or yield temperature in the range of 130 to 350° F., usually less than 150° F. when used in conjunction with electrical power cording having insulation with a maximum safe temperature rating of around 140° F. The temperature that is needed for actuation in particular circumstances can be quite precisely varied however, by selection of the alloy constituents.

When the device takes the form of an adapter, it includes female terminals on one side into which the male connectors of a conventional extension or appliance cord may be inserted. The adapter plug then can be inserted in a wall receptacle or other outlet, where it is responsive to above threshold temperature levels, whether caused by overheating from the extension cord/appliance side or from the receptacle or outlet itself, or from the circuit breaker side. Consequently the thermal protection device functions in response to sources from at least two directions, and irrespective of the manner in which overheating arises. Power to an insulated cord or associated appliance is shut off, eliminating power drain that may alternatively affect the wall receptacle or the circuit breaker. In addition, the protective device functions as a secondary current overload protector, responding, for example, to a current load if a circuit breaker fails in the closed circuit condition. When the male plug is integral with an extension cord, it preferably includes stress relief elements to resist the strain of pulling on the cord to detach the plug. All devices are of materials consistent with standard building codes and industrial design practices.

The thermal protective element can incorporate a means for indicating that the threshold condition has been exceeded and the device is in the open condition. As one example, a transparent window in at least one side of the element enables viewing of the position of one or more of the spring-loaded elements. As another example, an element moveable in the side of the protective device can be engaged and moved outwardly by the spring loaded element when the fusible material yields, indicating the failure condition in a manner visible from the outside.

In another example in accordance with the invention, existing circuit breakers can be augmented by an augmentation or backup protective device that is responsive to both thermal and electrical loads. A small unit having a mechanically biased conductive element held in place by a chosen temperature responsive alloy is electrically coupled into the circuit breaker and receives power-carrying wires for supplying exterior circuits in the building. The unit includes means for exerting pressure on the wire for better electrical contact, but limits conduction of heat to the exterior by incorporating a thermally non-conductive element in the force-exerting structure. The augmentation device is designed to have a maximum current limit greater than the circuit breaker, so that as long as the circuit breaker is functional, the augmentation device is not actuated by a current overload. However, in the event of circuit breaker overheating, or failure for any other reason, the augmentation device provides an added protection, including safeguarding against electrical overload if permitted by the circuit breaker failure condition.

In accordance with another feature of the invention, a separate circuit unit is provided that can be incorporated wherever insulated cable is disposed in the likely path of a fire. The interior-circuit device includes parallel conductors for each of the three lines of a grounded cable, one of the conductors including a conductive spring held by a meltable alloy in circuit with a current carrying wire, such as the positive line in a building system. This in-circuit device opens under any of several dangerous conditions, including excessively high wire temperature, excessively high environmental temperature, and severe current overload.

A different circuit unit in accordance with the invention is also provided that couples directly into the circuits of appliances or other electrical devices and is responsive to appliance temperature. By actuating when the appliance overheats, this unit independently assures against excessive heating of the appliance if the conventional temperature regulating element, usually a bi-metallic switching device, fails. The unit may be compact, and replaceably inserted into a small recess in the appliance.

BRIEF DESCRIPTION OF THE DRAWINGS

A better understanding of the invention may be had by reference to the following description, taken in conjunction with the accompanying drawings, in which.

DETAILED DESCRIPTION OF THE PREFERRED EMBODIMENTS

Figure 1:
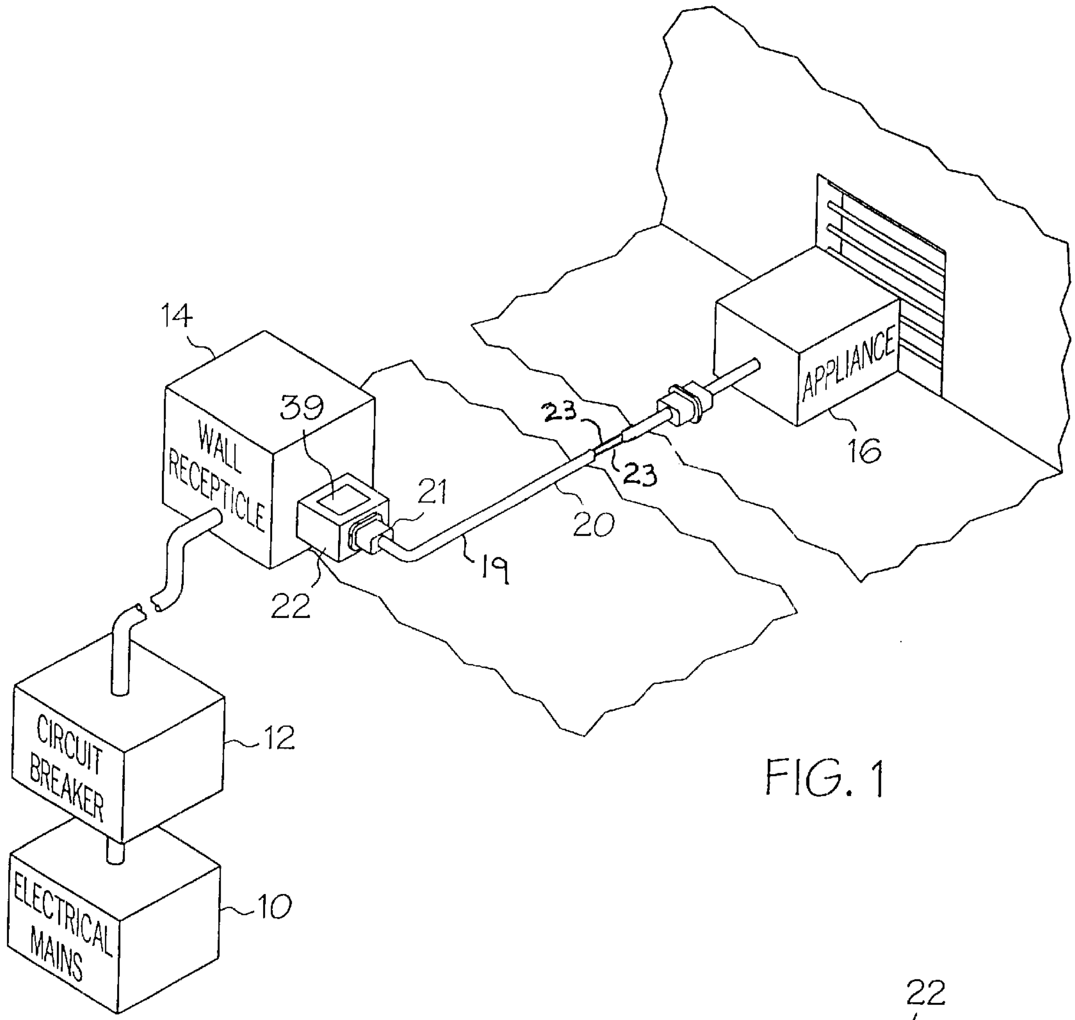
FIG. 1 is a somewhat idealized perspective view of an electrical cord installation between an appliance and wall receptacle in a building, the installation incorporating a thermally protected adapter plug in accordance with the invention.
Figure 2:
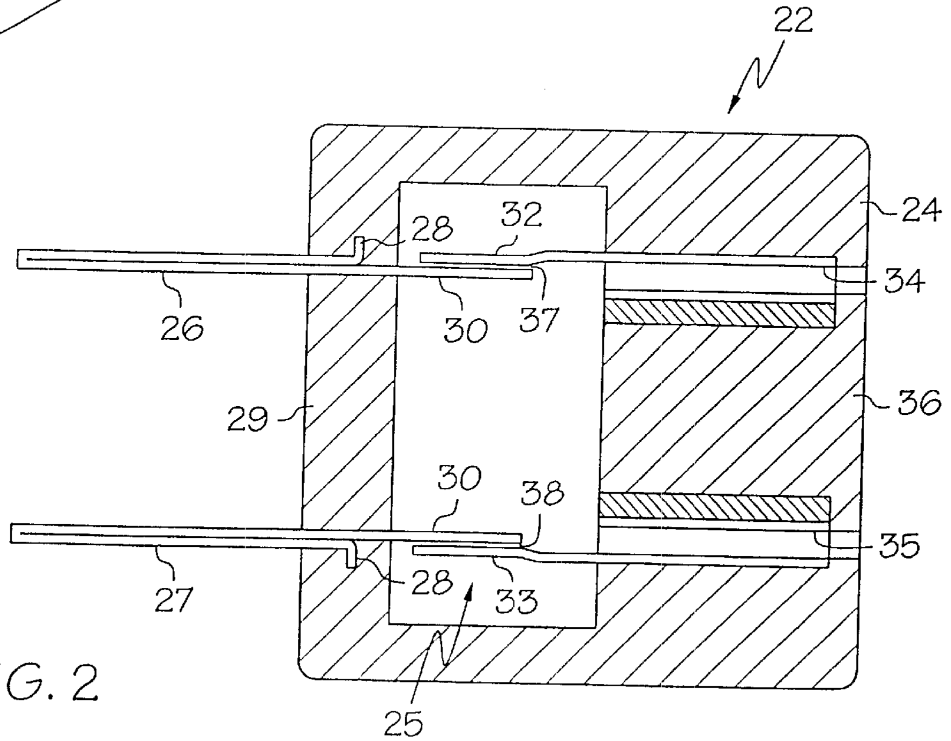
FIG. 2 is side sectional view of the thermally protected adapter plug of FIG. 1, showing the circuit in the closed condition.
Figure 3:
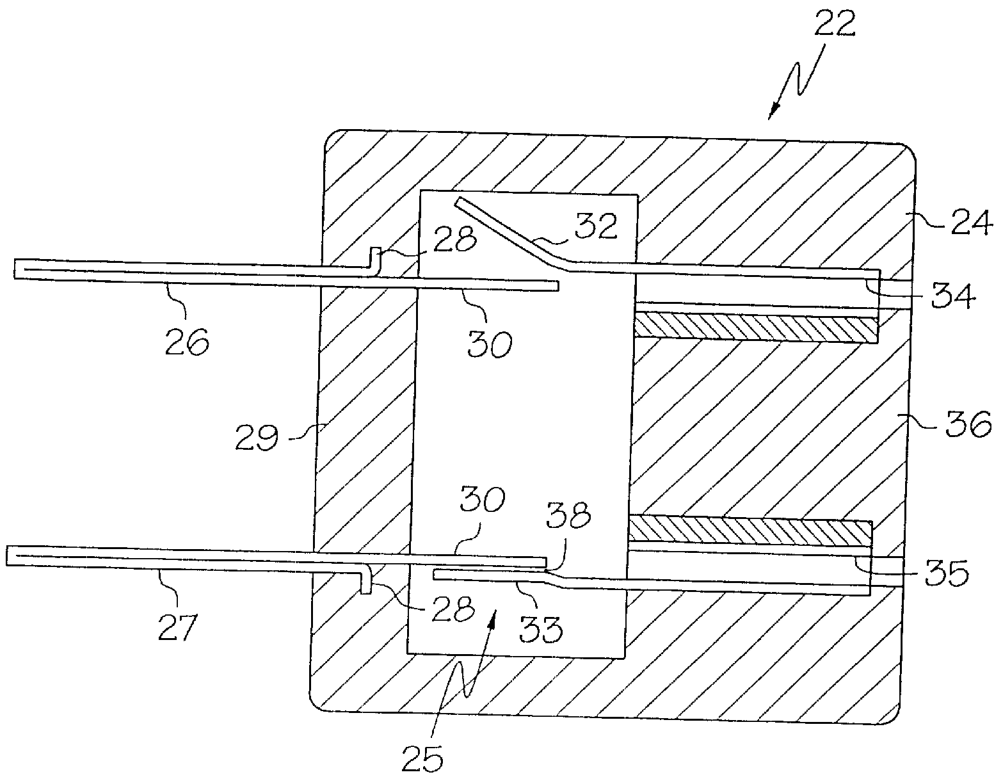
FIG. 3 is a side sectional view of the adapter plug of FIGS. 1 and 2, showing the open circuit condition.
Figure 4:
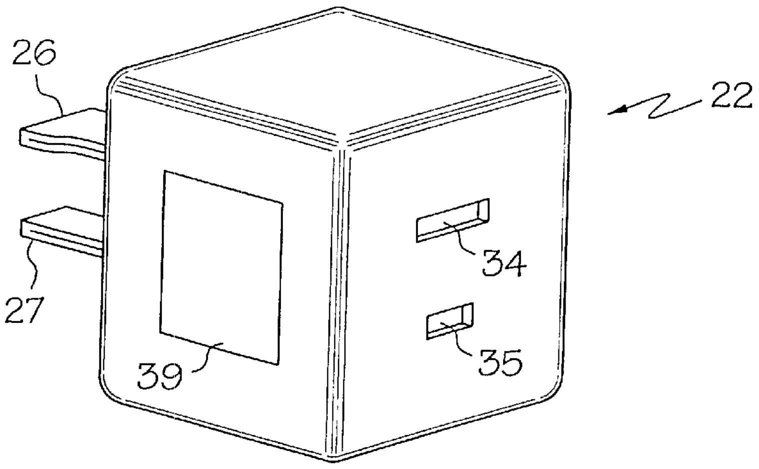
FIG. 4 is an end view of the adapter plug of FIGS. 1–3.

The simplified perspective view of FIG. 1 depicts a typical building installation in which there is a danger of possible overheating from any of a number of causes including failure of an electrical circuit or other indication of a fire. In this example the marginal conditions being guarded against result from the use of degradable material such as the insulation 19 on electrical power cording, illustrated in FIG. 1 as an extension cord 20, the possibility of wear or damage to the circuits themselves, and ambient temperature conditions that might exist where extension cord 20 is used.

In a typical residential installation, electrical energy coming from electrical mains 10 and a circuit breaker system 12 is distributed to wall receptacles or outlets 14 at a specific number of locations, inherently limited in number because these are part of the building structure. In this example, receptacle 14 is desirably configured in accordance with well-understood standards for the delivery of conventional AC electrical power, such as 125 VAC (not shown). Such standards may include, but are not limited to, 1-15R, 5-15R, 6-15R, 5-20R, 6-20R, and 7-15R NEMA configurations.

Appliances 16 and other electrically powered devices are often utilized temporarily or permanently wherever circumstances dictate, and thus under somewhat or highly unsafe conditions. As one example, a potential for overheating can exist wherever a length of extension cord, which is also called a cord set, a power cord, or other electrical power cording or power distribution circuit is used to connect an appliance 16 to a wall receptacle 14. For convenience, all such electrical power distribution circuits, whether extension cords, cord sets, power cords, or the like, are referred to simply as cord 20 herein.

Cord 20 includes at least two electrical power conductors 23 that are surrounded by insulation 19. In the preferred embodiment, insulation 19 is of a conventional composition and configuration. For example, insulation 19 may be the common, general purpose low temperature type of PVC which has a safe operating range of −40 to 140° F., of 0 to 140° F., of +32 to 140° F., or the like. The present invention may be particularly beneficial when used in conjunction with such a general purpose, low temperature insulation 19 because the maximum safe temperature rating at less than 150° F. is sufficiently low that it is easily exceeded in normal usage by a combination of ambient temperature and/or current loading. Moreover, as discussed below, the present invention may be implemented at little expense. Consequently, the safety of cord 20 with such low temperature insulation 19 may be dramatically improved without encountering the expense that might be associated with using a higher temperature insulation 19. However, those skilled in the art will appreciate that nothing prevents the present invention from incorporating other types of insulation that may have higher maximum safe temperature ratings. For example, higher temperature applications, such as cords 20 used with appliances 16 that incorporate heating elements, may very well benefit from using a higher temperature insulation 19 in accordance with the present invention.

The safety concern to which the present invention is primarily directed may result from appliance 16 malfunctioning and/or overheating, or the cord 20 itself may present special problems. If the cord 20 is worn or frayed, if it is in a confined space and/or the cord 20 is in a hot environment, if there is electrical overloading, or if there is a combination of hot temperatures exterior and interior to the insulation 19 of cord 20, then the cord 20 may overheat and tend to ignite flammable material. For a severe overloading condition, the fire danger may be immediate. However, when cord 20 is merely operated at an elevated temperature slightly in excess of its maximum safe rated temperature, then the fire danger increases steadily over time as the insulation 19 degrades from the heat.

A thermal protection device as seen in FIGS. 1–4, referred to herein as a thermal tracking plug 22, is in the form of an adapter plug insertable between the plug 21 of the cord 20 and the wall receptacle 14. The thermal tracking plug 22 can be of low cost construction and disposable, once it has been actuated, and it can later be replaced with another unit. The thermal tracking plug 22 has a body 24 of insulative material with an interior cavity 25, best seen in FIGS. 2 and 3. First and second male prongs 26, 27 protrude from one end of the body 24, and are configured for insertion into the wall receptacle 14. Accordingly, prongs 26 and 27 may be configured in accordance with well-understood standards for the delivery of conventional AC electrical power. Such standards may include, but are not limited to, 1-15P, 5-15P, 6-15P, 5-20P, 6-20P, and 7-15P NEMA configurations.

The prongs 26, 27 are of conductive and conventionally acceptable material such as USN 260 brass alloy, and include transverse retainers 28 in the wall 29 of the body 24, and internally projecting extensions 30 within the cavity 25. The extensions 30 are adhered to the ends of cantilever springs 32, 33 which extend into the cavity 25 from the opposite side. A conventional welding or soldering technique that insures high conductivity connections may be used. Each spring 32, 33 has an interior end engaging the side surface of a different extension 30 of a prong 26 or 27. The springs 32, 33 are normally curved outwardly away from each other and the extensions 30 in this embodiment. Thus they are mechanically biased and spring-loaded when brought into engagement with the extensions 30. The springs 32, 33 are part of, or attached to female receiving elements 34, 35 which are embedded in a second wall 36 of the body 24 to define the receiving socket for the inserted male prongs at the end of the male plug 21 of cord 20. Here the cord 20 is depicted as a two-wire line.

The cantilever spring ends 32, 33 in the cavity 25 are held in tensioned position in contact with the facing surfaces of the associated extensions 30 by interposed meltable alloy joinders 37, 38 respectively. The springs 32, 33 are designed to provide both the desired electrical conductivity in the electrical circuit and spring compliance. The cross sectional dimensions of the springs 32, 33 are chosen to be such that the springs have inherent conductivity which causes them to heat resistively to levels no greater than the copper of the associated extension cord. In other words, they heat no more than the wire they are protecting, and can respond proportionally to overheating along the line.

As illustrated in FIG. 1, thermal tracking plug 22 couples to cord 20 proximate insulation 19 of cord 20. In a typical situation, cord 20 experiences resistive and ambient heating somewhat evenly throughout its length since electrical power conductors 23 tend to be excellent heat conductors. Due in part to its proximity to insulation 19, thermal tracking plug 22 experiences or tracks the temperature experienced by insulation 19 of cord 20. Within thermal tracking plug 22, springs 32, 33 and joinders 37, 38 also experience a temperature increase. As discussed below, springs 32, 33 and joinders 37, 38 desirably experience heating at substantially the same rate as electrical power conductors 23. In other words, when cord 20 exhibits a predetermined temperature increase over the ambient temperature due to conducting a predetermined amount of electrical current, springs 32, 33 and joinders 37, 38 exhibit approximately the same predetermined amount of temperature increase over the ambient temperature. Desirably, joinders 37, 38 are configured to have a melting temperature approximately equal to the maximum safe temperature rating of insulation 19. When this melting temperature is reached, one or both of joinders 37, 38 melt, and the respective spring(s) 32, 33 deflect away from extension 30 to break the circuit and substantially eliminate the fire hazard.

The alloy joinders 37, 38 are here of a material having a melting point of approximately 125 to 350° F., although it will usually be in the lower end of this range. More specifically, the melting point of joinders 37, 38 is desirably selected to approximately equal the maximum safe temperature rating of insulation 19. In the preferred embodiment, where insulation 19 has a maximum safe temperature rating of around 140° F., joinders 37, 38 have a melting temperature around 140° F. In particular, in the preferred embodiments, joinders 37 have a solidus temperature of greater than 133° F. and a liquidus temperature of less than 150° F. Desirably, both the liquidus and solidus temperatures are as near to the maximum safe temperature rating of insulation 19 as practical to insure reliable operation without risking safety by permitting operation at temperatures greatly above the maximum safe temperature rating and without risking nuisance tripping at temperatures that are less than the maximum safe temperature rating.

Temperature-responsive alloys that exhibit a suitable melting point are typically formed of at least 40% Bismuth (Bi), less than 30% Lead (Pb), and less than 15% Tin (Sn). One suitable temperature-responsive alloy is "Cerro Alloy No. 5000-7, Cerro Bend", which is a semi-Eutectic, having an electrical conductivity of 4.17% IACS and capable of withstanding loads up to 300 psi. This alloy is composed of Bi-50%, Pb-26.7%, Sn-13.3% and Cd-10%. Another suitable joinder material is composed of Bi-47.5%, Pb-25.4%, Sn-12.6%, Cd-9.5%, and In-5.0%, and exhibits a conductivity of 2.43% TACS. Those skilled in the art will appreciate that these alloys which exhibit the desired temperature characteristics and physical properties to resist the long term tension exerted by springs 32, 33 may be poor electrical conductors, with conductivities typically less than 20% that of annealed copper. This poor conductivity is compensated for as discussed below.

The joinder material holds each cantilever spring arm 32, 33 in spring loaded position, but the thermal tracking plug 22 is vibration and shock resistant and the circuit remains closed until a joinder 37 or 38 yields, melts or fuses due to thermal effects. The spring-loading need not be large since the alloy yields, melts or fuses within a narrow temperature range, thus allowing the spring element to move to the open circuit position.

The yield temperature is usually chosen, at least in part, relative to the degradation temperature of the rubber or synthetic plastic or other insulation 19 that is used. For commonly used materials, such as in household insulation cord, the rated temperature is in the range of 140° F. Thus, with a yield point for the alloy selected at 141° F., there is assurance that temperature conditions will not cause cord failure. Choice of the yield point can, however, involve a number of other considerations. There is a margin of safety in the temperature rating of the cord, because cord degradation is affected both by the temperature level and the length of exposure. Thus short-term use or other special factors may justify a lesser safety factor. Moreover, resistive heating is not fully taken into account in other factors that are considered by the commonly accepted testing organization (Underwriter's Laboratories). That organization allows cord sets to be certified if they withstand up to 54° F. resistive heating above ambient temperature, which would limit usage to ambient temperature of 86° F. The important criteria in choosing the safety margin thus involve the consideration of the temperature of the environment in which the extension cord is located, in relation to that in which the safety device is positioned. The safety device may be in a controlled (e.g., air-conditioned) location and consequently a higher yield temperature may be used than when the safety device is substantially heated by its environment. Also, if a cord is in an exposed position where it might burn or injure individuals who contact it, the melting point threshold should be selected at a level which prevents this from happening.

While the degree of resistive heating of a wire depends upon its gauge or thickness, as well as the load (copper being assumed to be used in substantially all cases) resistive heating in the range of 20 to 40° F. greater than ambient temperature is often encountered when maximum wattage is applied. When the wattage increases above rated load the cord temperature increases disproportionately. When the ambient temperature itself becomes high, as in an attic or crawl space when the weather approaches 100° F. or more, the on-site temperature can reach 120 to 130° F., and it is obvious that a danger threshold is imminent. Consequently a safety device with a lower yield temperature may be advisable.

This fire danger can be presented by a combination of electrical and thermal conditions, as well as by such conditions existing separately. The safety device functions even though remote from the hot spot in the electrical system or along the length of the extension cord, or both, transfers heat along the thermally conductive portion of the extension cord, to the safety device. Conversely, if a defect exists in the receptacle causing or aiding overheating, one or both of the alloy joinders 37, 38 also melts, releasing the associated spring 32, 33 to assume the open condition of FIG. 3. This turns off the associated appliance 16, reducing the load in the supply portion of the system. If the appliance 16 overheats, while other thresholds are approached, the thermal tracking plug 22 can actuate to eliminate the appliance as a load in the system, while at the same time assuring that the cord 20 does not act as initiator of a flammable source. Circuit breaker and fuse protection, assuming no malfunction, protect against related electrical causes of failure, but a thermal protective device augments this with a different security function that also can provide an open circuit response in the event of failure of a circuit breaker when in the closed circuit position. The safety device thus can be regarded as bi-directional in its ability to respond to heat sources from different sources.

To enable the user to know whether the thermal tracking plug 22 has been actuated, a transparent non-conductive window 39 may be incorporated in a side wall of the body 24 in a position spanning and permitting viewing of one or both cantilever springs 32, 33. Preferably the window 39 is wide enough to enable both springs 32, 33 to be checked.

It is understood that the two prong adapter plug is shown by way of example only, and that an externally grounded connector, such as a three prong device, follows the same construction and principles and therefore need not be illustrated. The separate thermal tracking plug 22, used in conjunction with an extension cord 20, will often be advantageous because in the event of failure only the adapter device need be discarded. Furthermore, this enables usage of thermal tracking plugs 22 of different design specifications for different situations and conditions.

Figure 5:
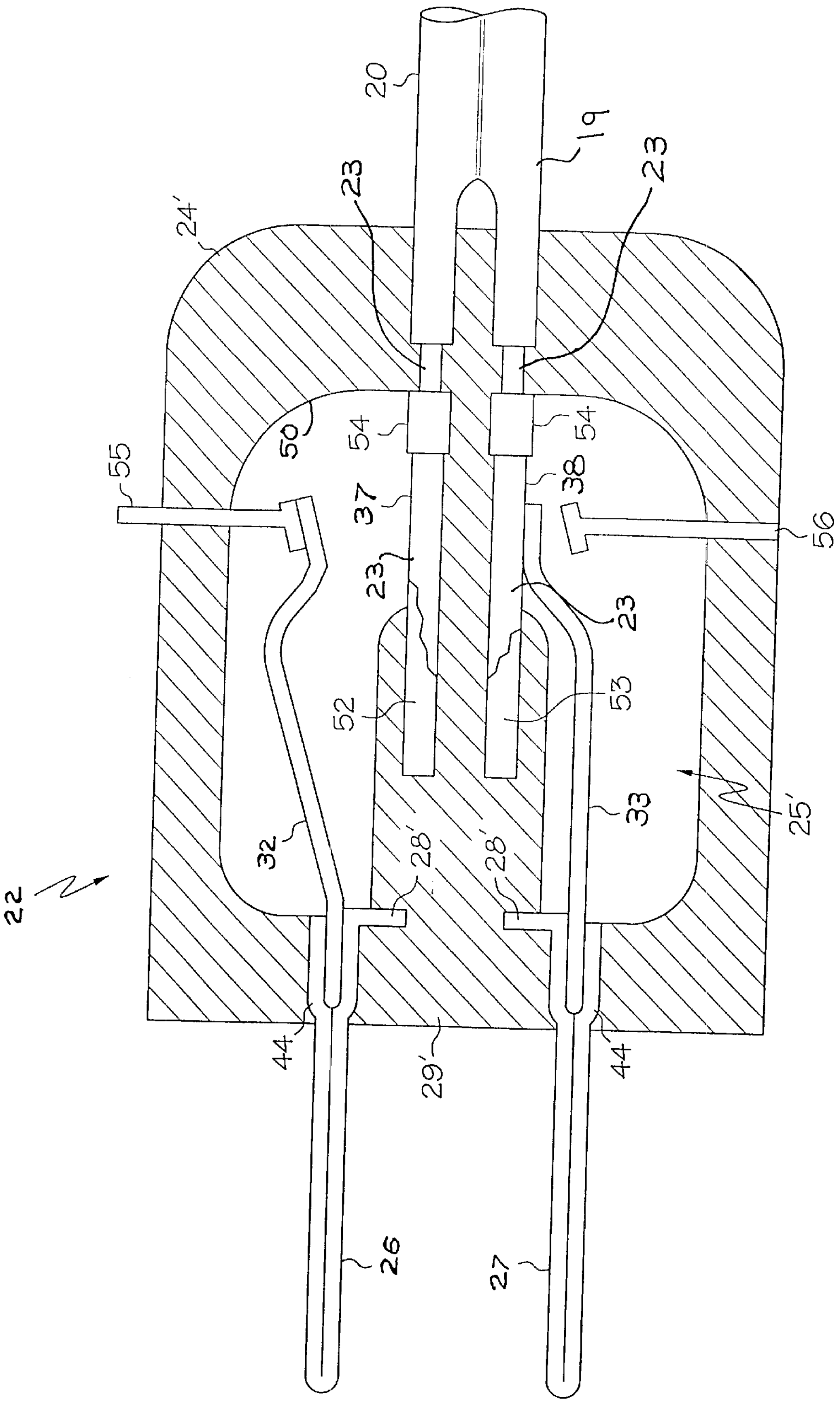
FIG. 5 is a side sectional view, partially broken away, of a thermally protected plug formed integrally with an item of electrical power cording and including an optional visual indicator device.

As depicted in FIG. 5, however, cord 20 can itself include a male thermal tracking plug 22 suitable for mating with a power receptacle integrally incorporated in the cord 20 at the time of manufacture. In this example, a conventional plug 21 as illustrated in FIG. 1 may be omitted. The male prongs 26, 27 which project from the forward end of the thermal tracking plug 22 are of USN 260 brass, and secured by retainers 28' in the wall 29'. They include bifurcated bases 44 which are solder joined to interior cantilevered springs 32, 33 extending into the cavity 25' of the body 24', and which are shaped to tend to spring outwardly. The base ends of the springs 32, 33 are held to conductive terminals 52, 53 which have been tinned with low temperature fusible alloy surfaces forming joinders 37, 38. In one preferred embodiment, conductive terminals 52, 53 are provided by bare electrical power conductors 23 from which insulation 19 has been removed. For strain relief, these conductive terminals 52, 53 are held against the adjacent wall 50 of the body 24' through which they extend by strain relief sleeves 54. Stresses on the plug end of the unit, such as might arise during repeated pulling of the plug from the electrical socket using the cord, therefore do not tend to separate any part of the plug. As depicted, if one of the alloy joinders 37 or 38 yields at its temperature threshold, it releases the associated spring 32 or 33 in circuit with a male prong 26 or 27 to swing outwardly from the extension cord central axis. In an optional embodiment, the cantilevered end engages a non-conductive indicator pin 55 or 56 which is frictionally seated in a side wall of the male plug 40, moving it outwardly to indicate the existence of the threshold overheating condition, and the opening of the circuit. The indicator pins 55, 56 are of insulative material, and preferably of a contrasting and vivid color, such as red, so that the open circuit condition can readily be detected.

In the preferred embodiments, springs 32, 33 are formed of a beryllium copper alloy so that they will resist fatigue from being held in the deflected, tensioned position for years. Accordingly, years after manufacture, if springs 32, 33 are called upon to deflect away from an extension 30 when its respective joinder 37, 33 melts, reliable operation is likely. In the preferred embodiment, a beryllium copper alloy having at least 0.25% beryllium and 0.45–0.65% combined nickel, cobalt and iron is one desirable alloy which, at minimal expense, exhibits desirable resilience and fatigue properties along with a desirable conductivity. In one particularly desirable embodiment, springs 32, 33 are configured as an alloy having the following composition.

TABLE 1

Composition of springs 32, 33

| Element | Value |
|---|---|
| Beryllium | 0.330% |
| Cobalt | 0.510% |
| Nickel | 0.020% |
| Iron | 0.020% |
| Silicon | 0.010% |
| Aluminum | 0.030% |
| Tin | <0.005% |
| Zinc | <0.010% |
| Chromium | <0.005% |
| Lead | <0.003% |
| Alloy Balance | Copper |

Figure 6:
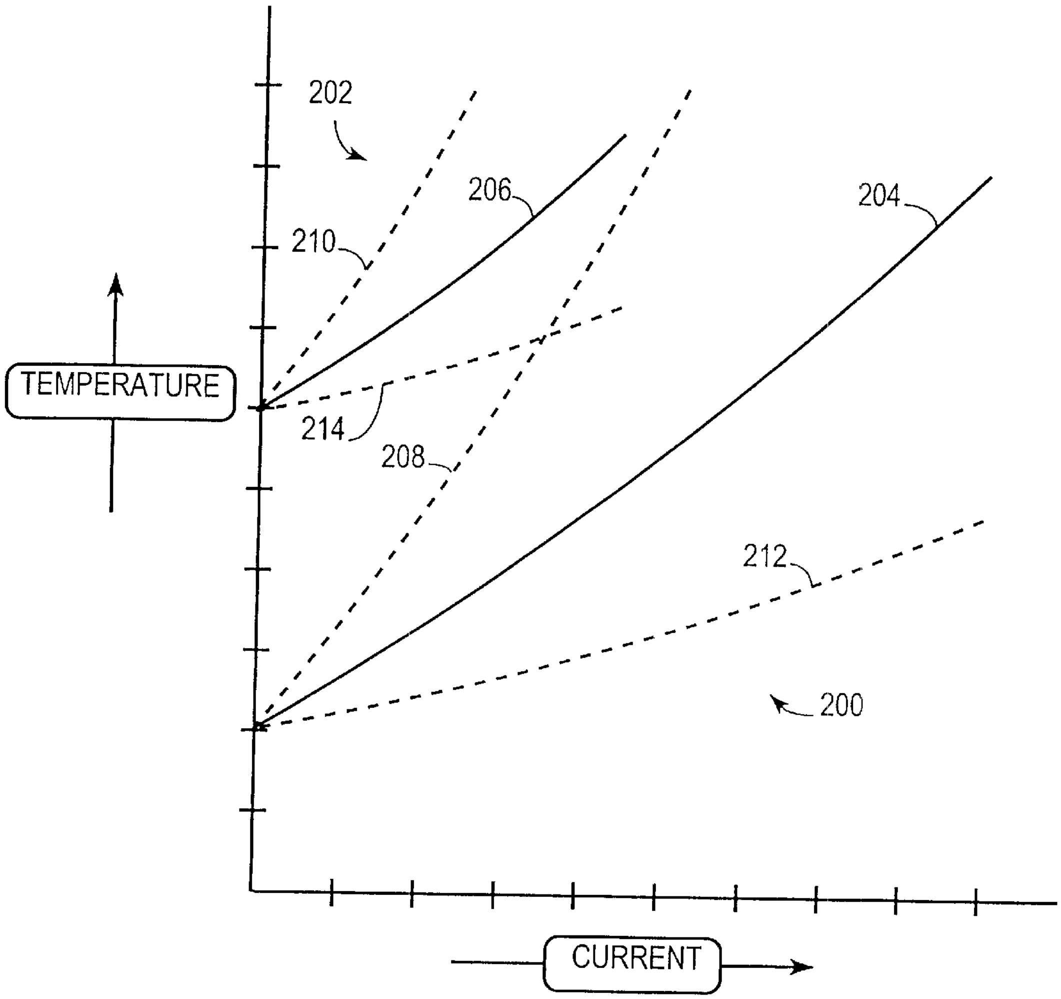
FIG. 6 shows two families of temperature versus current curves of electrical conductors.

FIG. 6 shows a graph having two families of electrical current versus temperature curves. A lower family of curves 200 depicts the approximate temperature behavior of a conductor, such as an electrical power conductor 23 (FIG. 1), at a lower ambient temperature (e.g., 75° F.) as the electrical current conducted by the conductor increases. An upper family of curves 202 depicts the approximate temperature behavior of a conductor at a higher ambient temperature (e.g., 95° F.) as the electrical current conducted by the same conductor increases. In each family 200, 202, a solid curve 204, 206 in the center of the family depicts performance for a conductor having a given conductance (e.g., 16-gauge copper wire). In each family 200, 202, an upper dotted curve 208, 210 depicts performance for a conductor having marginally less conductance (e.g., 20-gauge copper wire). And, in each family 200, 202, a lower dotted curve 212, 214 depicts performance for a conductor having marginally greater conductance (e.g., 12-gauge copper wire). As depicted in FIG. 6, the less the conductance, the greater the temperature increase with a given amount of current increase. Moreover, the greater the ambient temperature, the less current that may be conducted without conductor, and hence surrounding insulation, temperatures exceeding a predetermined threshold, such as 140° F.

Those skilled in the art will appreciate that the conductance of conductor 23 depends upon the conductance of the material from which conductor 23 is made and from the geometry of conductor 23. Hence, a 12-gauge copper wire has greater conductance than a 20-gauge copper wire and less conductance than a 12-gauge copper wire, other factors being equal.

Referring to FIGS. 1–6, in the preferred embodiments of the present invention, the conductance of springs 32, 33 desirably matches the conductance of conductors 23 so that the temperature of springs 32, 33 approximately matches the temperature of conductors 23 and hence the temperature of insulation 19, regardless of ambient temperature or electrical loading. As illustrated in FIG. 6, that temperature results from the ambient temperature plus any temperature rise due to the conductance of conductor 23 and the electrical current being carried by conductor 23. However, springs 32, 33 having desirable fatigue resistance properties of the type discussed above typically exhibit less than 70% of the material conductance of annealed copper. The preferred spring composition set forth in Table I above exhibits a conductivity approximately 50% TACS. Accordingly, in order for the overall conductivity of springs 32, 33 to match the overall conductivity of conductors 23, the dimensions of springs 32 and 33 are controlled so that geometry compensates for the reduced material conductance of the material from which springs 32, 33 are made.

Figure 7:
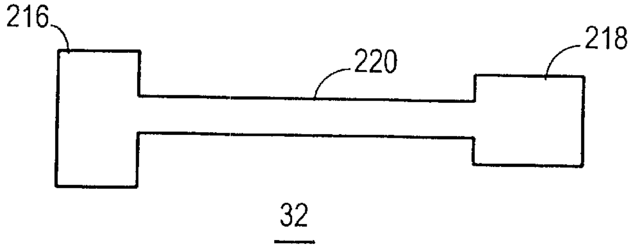
FIG. 7 shows an exemplary spring included in a thermal tracking plug configured in accordance with one embodiment of the present invention.

FIG. 7 illustrates an exemplary top view of spring 32 as configured for an application that uses 16-gauge copper wire for electrical power conductors 23 (FIG. 1), an insulation 19 (FIG. 1) having a maximum safe temperature rating of around 140° F., and thermal tracking plug 22 integrally formed on cord 20 during manufacture, along the lines depicted in FIG. 5. Spring 33 (FIGS. 2–3 and 5) desirably has identical characteristics to those of spring 32. In this example, spring 32 is formed from 0.025" thick material of the type discussed above. Spring 32 is formed in the shape of an "I" having a plug bar 216, a cord bar 218, and a connecting bar 220. Plug bar 216 mates with plug prongs 26, 27 (FIG. 5) and is approximately 0.25" by 0.15". Cord bar 218 is held in place against conductors 23 with joinder elements 37, 38 as discussed above, and is approximately 0.16" by 0.20". Connecting bar 220 extends between plug bar 216 and cord bar 218 and is approximately 0.075" by 0.625". The overall length of spring 32 may thus be less than 1". While spring 32 exhibits less material conductivity than 16-gauge copper wire, the cross sectional area of the alloy from which spring 32 is formed and through which electrical current passes is sufficiently larger than the cross sectional area of 16-gauge copper wire to compensate for the reduced material conductivity. Consequently, springs 32, 33 exhibit roughly the same current versus temperature curves 204, 206 (FIG. 6) as are exhibited by conductors 23. By matching the current versus temperature characteristics of springs 32, 33 to the current versus temperature characteristics of conductors 23, springs 32, 33 tend to track the temperature of conductors 23 and insulation 19, regardless of ambient conditions and electrical load.

Likewise, joinder elements 37, 38 desirably exhibit roughly the same current versus temperature curves 204, 206 as are exhibited by conductors 23 so that they too will track the temperature experienced by insulation 19. In the above-presented example where the thermal tracking plug 22 is mated with 16-gauge copper wire and insulation having less than a 150° F. maximum safe temperature rating, stripped ends of conductors 23 (FIG. 5) and cord bar 218 (FIG. 7) are first tinned with the joinder 37, 38 alloy material at a temperature around 450° F. Then, later during the manufacturing process each tinned cord bar 218 is held in physical contact with a corresponding tinned conductor 23 while approximately a 25 mg drop of the joinder 37, 38 material is applied at around 450° F. Although not depicted in the figures, cord bars 218 may be curved to conform to a curved shape typical of 16-gauge wire. The cross-sectional surface area of cord bar 218 over which joinder material 37, 38 is applied is sufficiently large but sufficiently thin to compensate for the poor conductivity of the joinder material. Due to this compensation, joinders 37, 38 tend to experience the same temperature increase over the ambient that is experienced by conductors 23 and springs 32, 33 due to resistive heating. Consequently, joinders 37, 38 tend to melt at approximately the conditions where insulation 19 reaches its maximum safe temperature rating.

The above-discussed thermal tracking plug 22 couples conductors 23 both thermally and electrically in series with prongs 26, 27, springs 32, 33, and joinders 37, 38. The electrical coupling is necessary for cord 20 to achieve its purpose. The thermal coupling helps joinders 37, 38 to experience substantially the same temperature experienced by insulation 19. Moreover, in one common scenario posing a fire hazard, one of plug prongs 26, 27 may make a bad, high resistance connection with its mating connector in receptacle 14 (FIG. 1) The high resistance at that point in the receptacle 14 causes an unusually large temperature increase as electrical current flows. This high temperature is thermally conducted through the respective prong 26, 27 and spring 32, 33 to a joinder 37, 38. When the temperature of a joinder 37, 38 reaches its melting point, the circuit opens, electrical current ceases, and the fire danger is eliminated.

Figure 8:
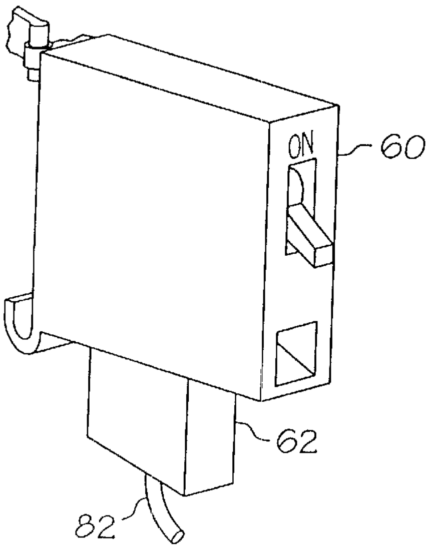
FIG. 8 is a perspective view, partially broken away, of a circuit breaker unit including an augmentation device in accordance with the invention for providing additional protection against thermal overload.
Figure 9:
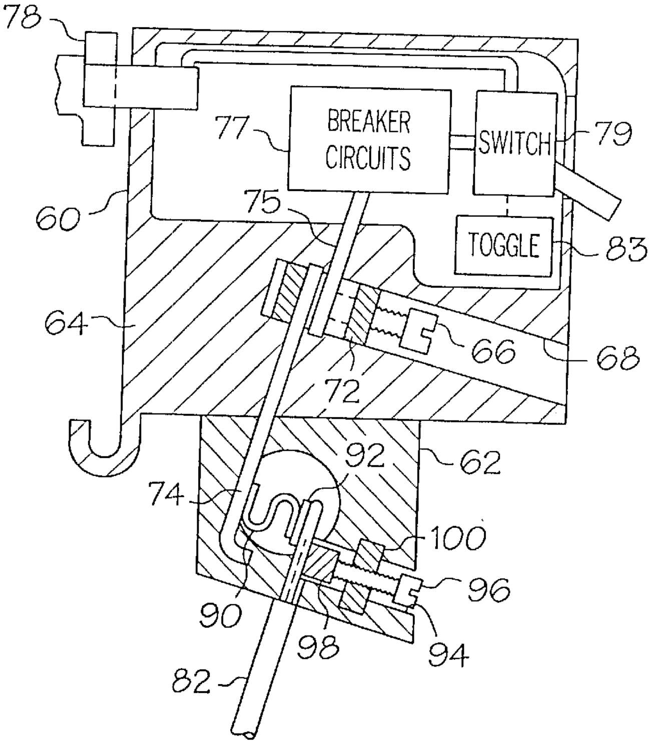
FIG. 9 is a side sectional view, viewed from the opposite side of the circuit breaker and installed augmentation device of FIG. 8, with the unit in closed circuit condition.

In another application of a device in accordance with the invention, the principal electrical circuit component in a system to be protected is the positive (black insulated) wire in a building installation having a circuit breaker 60. The circuit breaker 60 itself is of conventional form, but the circuit includes an augmentation or supplementary safety device 62 as shown in FIGS. 8–9. The circuit breaker body 64 includes a wire clamp in the form of a screw 66 seated within a bore 68 in the body 64. A threaded nut 72 portion of a C-shaped structure in the bore 68 receives the clamp screw 66 which engages a copper bar 74 extending from the augmentation device 62. The clamp screw 66 also receives a bus bar 75 from the breaker circuits 77 (shown only diagrammatically) that is angled through the body 64 to overlap the copper bar 74 beneath the clamp screw 66. The bars 74, 75 are thus held in close engagement by the end of the clamp screw 66 which tightens the connection against the interior half of the C-shaped structure. Power is received from a building bus 78 coupled through the settable switch 79 to the breaker circuits 77 which function in conventional fashion. A toggle 83 operates the switch 79 to maintain one of two polar positions, on or off.

In this example the outgoing building wire 82 from the individual circuit breaker 60 is coupled into the intervening augmentation device 62 at a stripped end 84 which is spaced apart from the solid connector bar 74 that protrudes outwardly to engage in the circuit breaker 60. The stripped end 84 of the individual building wire circuit line 82 nests in a U-shaped wire seat 86 which extends into an inner cavity 88 in the augmentation device 62. Within this inner cavity, a circuit connection is made by an S shaped beryllium copper spring 90, joined fixedly at one end of the S to the connector bar, and joined detachably to the wire seat 86 at the other end of the S by a Cerro alloy joint 92 (FIG. 9). The melting point of this Cerro alloy joint 92 is selected with respect to both thermal threshold conditions and electrical overload threshold conditions, as described below. Also, the cross-sectional area of the beryllium copper spring 90 is again dimensioned to assure that resistive heating increases at a rate consistent with the other electrical circuit elements.

The stripped end 84 of the building wire 82 is held securely against the wire seat 86 by a second clamp screw 96 extending through a side bore 94 in a direction perpendicular to the wire 82 axis. A nonconductive pressure block 98 in the second clamp screw 96 fits against the stripped end 84, and a nut plate 100 in an intermediate section of the side bore 94 retains the clamp screw 96, the end of which engages the nonconductive block 98, and which can then be tightened against the block 98 so as to assure contact between the power supply line 82 and the wire seat 86. The power supply conductor 74 for the augmentation device 62 is in the form of a short rod or bar that is suitably thick and strong to retain the augmentation device 62 and individual circuit power supply line 82 securely in any normal use.

Figure 10:
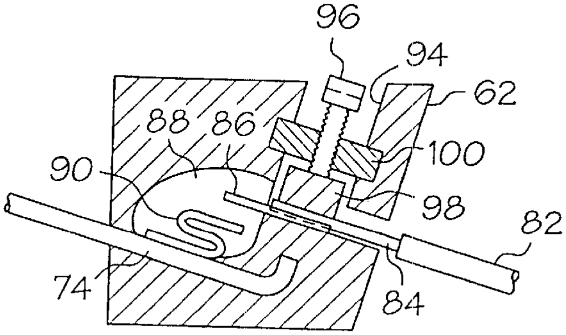
FIG. 10 is a side sectional view of a portion of the device of FIGS. 8 and 9, showing the augmentation device in open circuit condition.

The augmentation device 62 supports the circuit breaker 60 in both electrical and thermal overload modes. As seen in FIG. 10, if the Cerro alloy joint 92 melts, then the beryllium copper spring 90 is released and contracts, creating an adequate gap from the wire seat 86 to prevent arcing. The temperature threshold point is selected, by choice of the Cerro alloy material, so as to be higher than the threshold of the circuit breaker 60 for circuit overload conditions. Consequently, if the circuit breaker 60 is opened because of excessive current loading, such as a short, it may simply be reset and the augmentation device 62 will not have opened. If, however, the circuit breaker malfunctions, resistive heating at the Cerro alloy joint 92 and/or the S-shaped spring 90 will be sufficient to melt the joint, and to open the circuit in the augmentation device 62, providing a second level of protection. In addition, the thermal overload condition, whether arising from heat generated by interconnected circuits or from ambient or associated temperature levels, will melt the Cerro alloy joint, opening circuits and shutting off the power. An example of the latter situation is significant in areas having hot, dry climates, in which brush and forest fires can have devastating effect. A fire approaching a house may not itself ignite a fire, but if power continues to be supplied, as is usually the case, then the local overheating, which substantially increases interior temperatures, can lead to insulation failure. This may result in internal ignition, which is often seen in these devastating fires as a sudden explosion of flame from within the residence.

Figure 11:
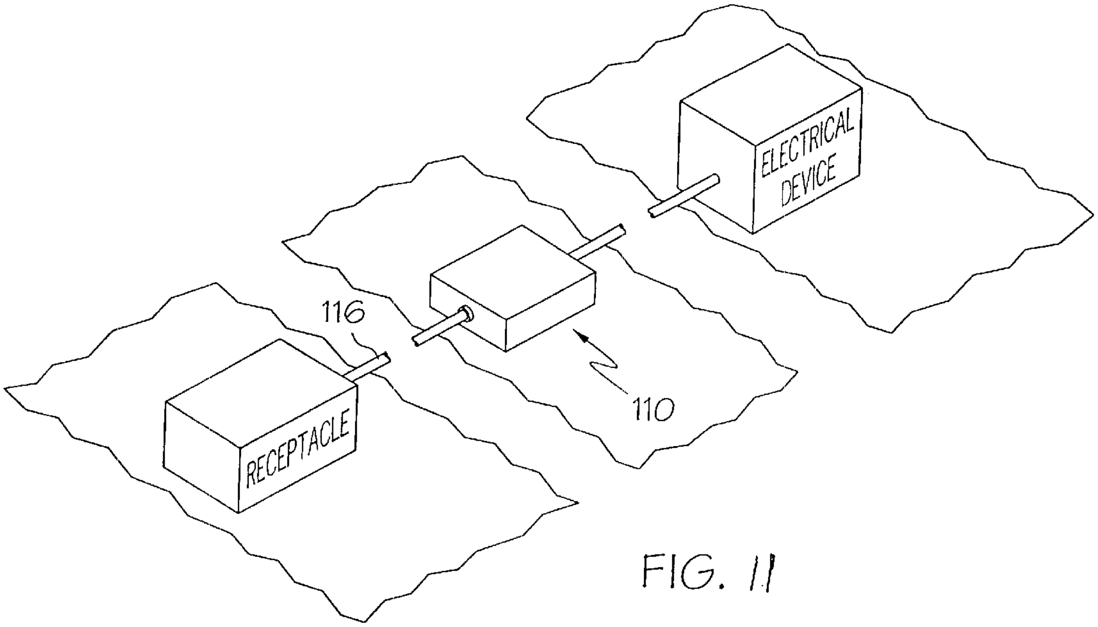
FIG. 11 is a perspective view, partially broken away, of an installation including an in-circuit protection device coupled into a three-wire cable in a location in which thermal protection may be needed.
Figure 12:
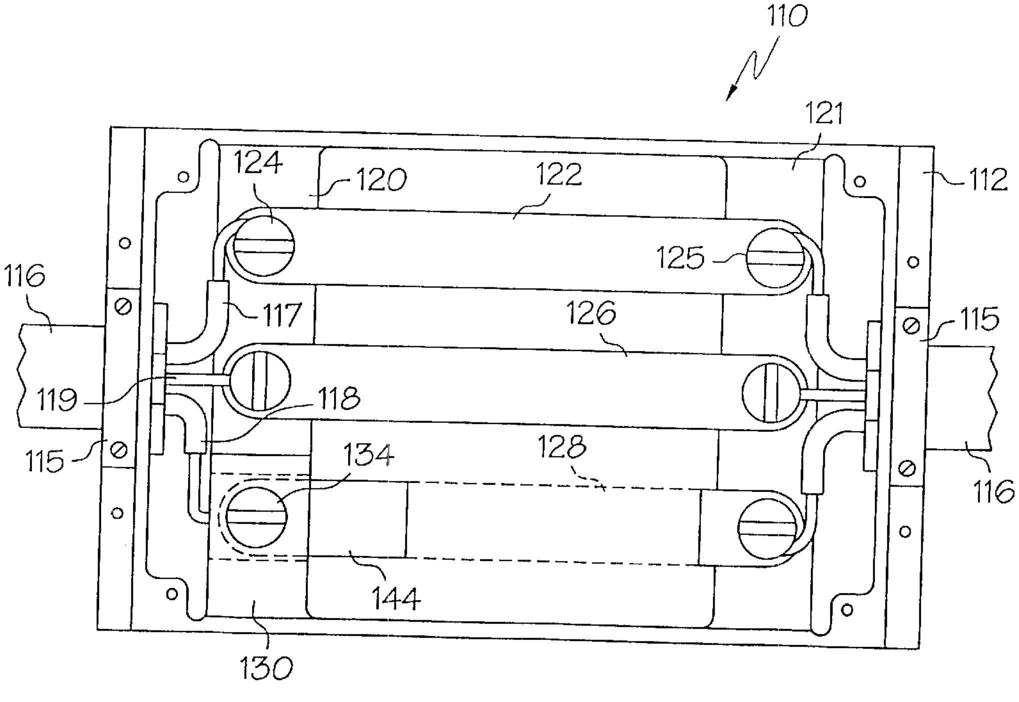
FIG. 12 is a top view of the arrangement of FIG. 11, with the cover removed.
Figure 13:
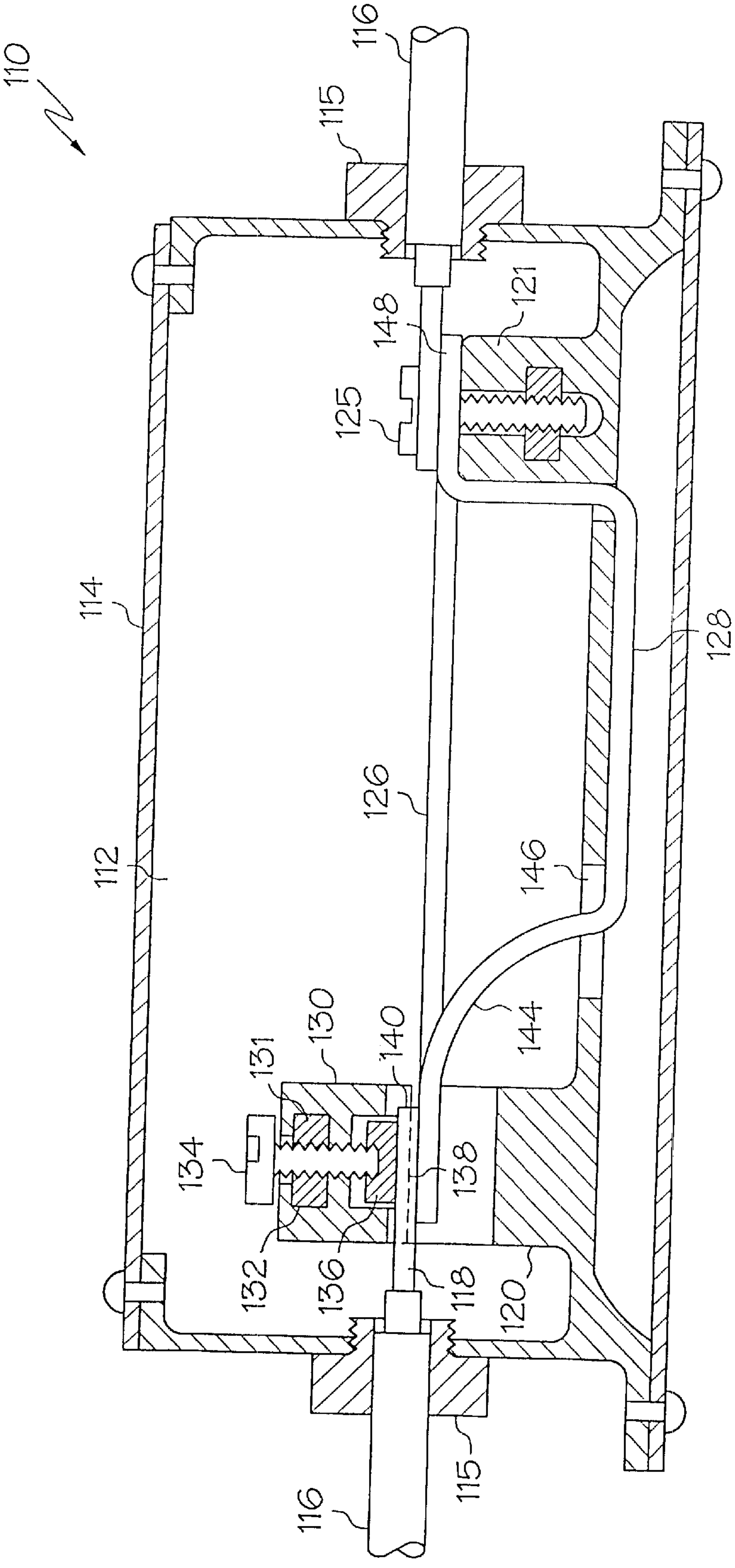
FIG. 13 is a side sectional view of the device of FIGS. 11 and 12.

A different form of protection is provided by an in-circuit protective device 110 (FIGS. 11–13) interposed in an intermediate portion of the length of an extension cord or other electrical connection system. The in-circuit protective device 110 is confined within a rectangular housing 112 having a cover 114 and anchor clamps 115 for receiving cord ends in the end walls. The device 110 is aligned with the principal axis of an insulated cord 116 of the type having separately insulated wires 117, 118 (conventionally referred to as the black and white wires) and a center ground wire 119. A pair of non-conductive crossbars 120, 121 extend laterally across the base of the housing 112, parallel to the end walls, providing separate connection terminals for the wires 117–119. The spaced-apart stripped ends of the white wire 117 are interconnected by a first copper strip 122 between the tops of the crossbars 120, 121. The wire 117 ends are forced against the first copper strip 122 by separate hold down or wire mount screws 124, 125 threading into the respective crossbars, 120, 121. Similarly, a second copper strip 126 extending between the crossbars 120, 121 is engaged to couple the spaced apart opposite ends of the central or ground wire 119 by hold down screws.

The third parallel path interconnecting the separated ends of the black wire 118 is provided by a beryllium copper strip 128 extending between an elevated spring mount 130 on the first crossbar 120 and the top of the second crossbar 121, being retained at each end by a hold down screw as previously described. At the elevated spring mount 130, however, the beryllium copper strip 128 is seated against the underside of the uppermost part of the elevated mount 130. It is secured by a nut plate 131 in a bore 132 through which a pressure screw 134 extends against a nonconductive block 136. The nonconductive block 136 engages the stripped end of the black wire 118, which in turn rests against a copper U-shaped wire seat 138 in the same manner as the arrangement of FIGS. 8–10. An alloy joint 140 on the underside of the wire seat 138 engages the top side of a curved end section 144 of the beryllium copper strip 128 that is shaped to form a spring element that is mechanically biased away from the alloy joint 140, so as to be released when the alloy joint melts. The beryllium copper strip 128 is configured in its mid region to extend through one or more openings in the bottom wall of the housing base 112, so as to provide an adequate length of curvature of the spring end 144 for movement away from the seat 138 when released. The end 144, when free, moves downward within a cavity 146 in the elevated spring mount 130. The opposite end of the beryllium copper strip 128 includes a pair of 90° angles shaping it around and over the second crossbar 121. Contact between the stripped end of the black wire 118 and the static end 148 of the strip 128 is assured by a hold down screw as previously described. A bottom cover of nonconductive material may be used to assure that the underside of the beryllium copper strip 128 is not exposed.

By inserting the in-circuit protective device 110 in a region of maximum risk along a cord or cable, the device 110 provides protection against fire danger from individual or a combination of causes, as long as they are expressed in the form of a temperature variation. A single cause, or a combination of causes that may result in opening the protective device can include current overload and/or conductor temperature. This version has the advantage of enabling placement in a preselected position, as well as allowing selection of a specific actuation temperature by use of an appropriate alloy. Heat sources near the wire that are adequately electrically isolated can be thermally coupled to the beryllium copper strip 128 by heat conductor elements so that an overheating condition caused by a non-electrical source can be protected against.

Additionally, it can be appreciated that melting of the alloy joint 140 does not require disposal of the entire unit 110. The beryllium copper strip 128 can simply be removed from the device along with the wire seat 138, from which it has separated, and a new joint combination of strip 128 and seat 138 can be reinserted and fixed mechanically in place so as to be joined to both ends of the wire 118.

Figure 14:
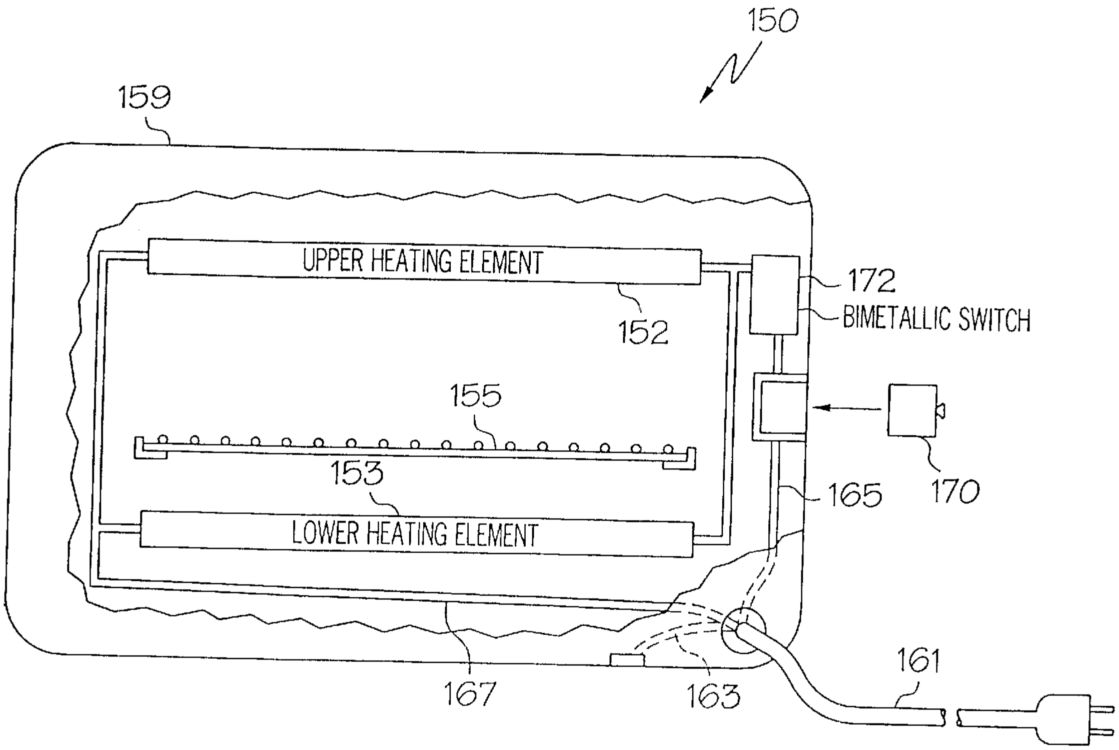
FIG. 14 is a diagrammatic representation of an in-circuit thermal protector for electrical appliances and devices.
Figure 15:
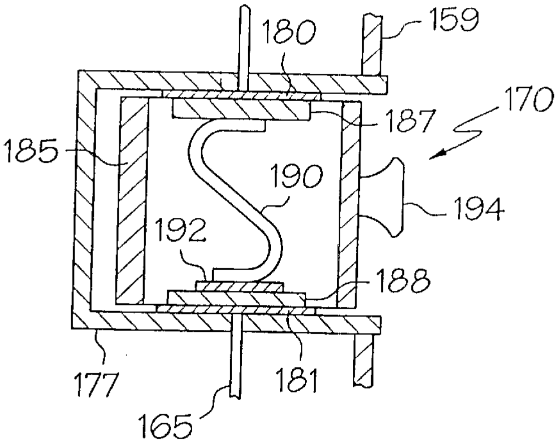
FIG. 15 is a fragmentary perspective view of a replaceable plug-in thermal protector unit that may advantageously be used in the device of FIG. 14.

FIGS. 14 and 15 show how a thermal protection device in accordance with the invention can be used as a thermal overheat protector for an electrically heated domestic appliance such as a toaster oven. The overall arrangement is depicted in somewhat simplified form in FIG. 14, while a replaceable thermal protection device is shown in FIG. 15. The toaster oven 150, seen from the back, has conventional upper and lower heating elements 152, 153 on opposite sides of a centrally disposed slide tray 155 accessible through a front door (not shown in FIG. 14) in the housing 159.

The housing 159 of the appliance is typically of metal, although it may have plastic insulating sections. A three wire electrical cord 161 coupled into the housing 159 is divided so that the ground line 163 is secured to the metal appliance case, and the input line (black insulated wire) 165 feeds to the heating elements 152, 153 while the return line (white insulated wire) 167 from the opposite end of the heating elements 152, 153 returns to the electrical cord 161. In circuit with the input line 165 (black wire) is a thermal protection device 170 which is in thermal conductive relation to the housing 159 wall, with the electrical circuit being completed to the heating elements 152, 153 by a conventional bi-metallic temperature control switch 172. The thermal protection device 170 may simply be wired permanently into the structure, but it can also be advantageous for the unit to be constructed as a replaceable or "drop-in" element in the housing 159. To this end, as seen particularly in FIG. 15, a small chamber 177 is provided as an insulated cubicle accessible through an opening in a side wall of the housing 159 electrical connections are made by a pair of electrodes 180, 181 on opposite sides of the cubicle 177, the electrodes being in circuit with the black wire 165 between the extension cord and the bi-metallic temperature control switch. The drop-in thermal protection device comprises insulated side walls 185 which may form a complete rectangle, together with conductive top and bottom walls 187, 188 which, when the protective device 170 is installed, contact the opposite electrodes 180, 181. The circuit is completed by an interior, S-shaped, compliant spring 190 of beryllium copper. This spring is configured to be under tension, when stretched between the opposite conductive walls 180, 181, but is stretched and held in place by a Cerro alloy joint 192.

The cross sectional dimensions of the beryllium copper spring 190 are again selected to provide resistive heating corresponding to the resistive heating interior to the toaster oven 150 in accordance with current load. The Cerro alloy joint 192 is selected to provide a desired margin of safety with relation to the construction of the appliance itself, which depends upon the degree of heating normally reached in the toaster oven 150, the construction of the toaster oven, the amount of non-metallic material that is used, and the extent to which users are to be protected against overheating. Cerro alloys are available with melt/yield temperatures of up to 740° F., and beryllium copper alloys are also available that maintain their spring compliance under stress even at high temperatures. Accordingly, the melt/yield temperature can be selected at a substantially higher range than for an extension cord or similar structure, the level being, for example, in the range of 250 to 450° F. Since appliances are a major cause of fire in residential and non-residential structures and since bi-metallic current protective elements will stick and malfunction, or be subject to hysteresis effects that will cause them to malfunction, overheating can often occur. In a toaster oven, for example, the appliance can be left on with food products inside which ultimately can catch on fire. In consequence, the interior temperature of the oven can become high enough to start other combustibles, such as the wiring to and within the appliance, on fire. In such a situation, the thermal protection device turns off the current, and the burning food by itself does not have sufficient thermal energy to breach the interior oven wall of the appliance, thus containing the fire. Because the current is turned off, even if the food fire melts wiring insulation or other components a secondary electrical fire is prevented.

The principle of having a secondary thermal protection device that is electrically effective but primarily thermally responsive can be applied to a number of other electrical appliance and mechanism situations, including electrical heaters that are portable or permanent. If the thermal overload condition triggers the device 170, the spring 190 contracts, providing a permanently opened circuit condition. The entire device 170 may simply be withdrawn from the cubicle 177 by an exteriorly accessible handle 194 which can then be replaced with a new unit in the event that the appliance has not been damaged by the internal fire or other cause of the thermal overload condition.

It is recognized that a replaceable or plug-in thermal protection unit may introduce another factor that can have adverse consequences. If, for example, an unknown downline condition, such as a defective bi-metallic switch, causes the failure, then replacing the thermal protection unit creates the possibility of again causing overheating and fire danger. Obviously, however, one exhibiting reasonable care knows that the possible sources of overheating of the thermal protective device are elsewhere than at the device, and must be definitively located before a replacement device is inserted.

Although specific types of alloys have been mentioned, other existing alloys may be used as well as new ones as they become available. The types mentioned have particular advantages because of the mechanical adhesion properties they possess together with their close control of temperature responsiveness. It should also be appreciated that the preferred usage of beryllium copper springs is indicated, but not necessary, because of the relatively high conductivity such elements possess, along with needed spring force.

While a number of forms and modifications in accordance with the invention have been described above, it should be appreciated that the invention is not limited thereto but encompasses all variations and alternatives within the scope of the appended claims.

What is claimed is:

1. A thermally protected electrical power distribution circuit comprising:

an electrical power conductor surrounded by insulation, said insulation having a maximum safe temperature rating of less than 150° F.; and a thermal tracking plug coupled to said electrical power conductor proximate said insulation, said thermal tracking plug having an electrical plug prong configured for insertion in an electrical power receptacle, a spring, and a joinder element holding said spring against one of said electrical power conductor and said electrical plug prong so that said spring, said electrical plug prong and said electrical power conductor are electrically and thermally in series, said joinder element having a liquidus temperature less than 150° F.

2. A circuit as claimed in claim 1 wherein:

said electrical power conductor is a first electrical power conductor, said spring is a first spring, said electrical plug prong is a first electrical plug prong, and said joinder element is a first joinder element;

said circuit additionally comprises a second electrical power conductor surrounded by insulation having a maximum safe temperature rating of less than 150° F., and said second electrical power conductor being associated with said first electrical power conductor in a circuit;

said thermal tracking plug additionally comprises a second an electrical plug prong configured for insertion in an electrical power receptacle, a second spring, and a second joinder element holding said spring against one of said second electrical power conductor and said second electrical plug prong so that said second spring, said second electrical plug prong and said second electrical power conductor are electrically and thermally in series, said second joinder element having a liquidus temperature less than 150° F.

3. A circuit as claimed in claim 1 wherein:

said electrical power conductor is of a gauge and composition configured to exhibit a predetermined temperature increase when conducting a predetermined amount of electrical current;

said spring is of a composition and is dimensioned so that said spring exhibits approximately said predetermined temperature increase when conducting said predetermined amount of electrical current; and said joinder element is of a composition and is dimensioned so that said joinder element exhibits approximately said predetermined temperature increase when conducting said predetermined amount of current.

4. A circuit as claimed in claim 1 wherein said joinder element has a solidus temperature greater than 133° F.

5. A circuit as claimed in claim 1 wherein said joinder element comprises a composition of greater than 40% bismuth, less than 30% lead, and less than 15% tin.

6. A circuit as claimed in claim 1 wherein:

said electrical power conductor and said joinder element exhibit first and second conductivities, respectively, with said second conductivity being less than 20% of said first conductivity;

said electrical power conductor is of a gauge which causes said electrical power conductor to exhibit a predetermined temperature increase when conducting a predetermined amount of electrical current; and said joinder element is dimensioned to exhibit substantially said predetermined temperature increase when conducting said predetermined amount of electrical current.

7. A circuit as claimed in claim 1 wherein said spring comprises an alloy which is greater than 0.25% beryllium and between 0.45% and 0.65% combined nickel, cobalt and iron.

8. A circuit as claimed in claim 1 wherein:

said electrical power conductor and said spring exhibit first and second conductivities, respectively, with said second conductivity being less than 70% of said first conductivity;

said electrical power conductor is of a gauge which causes said electrical power conductor to exhibit a predetermined temperature increase when conducting a predetermined amount of electrical current; and said spring is dimensioned to exhibit substantially said predetermined temperature increase when conducting said predetermined amount of electrical current.

9. A thermally protected electrical power distribution circuit comprising:

an electrical power conductor surrounded by insulation, said electrical power conductor having a predetermined maximum safe temperature rating; and a thermal tracking plug coupled to said electrical power conductor proximate said insulation, said thermal tracking plug having an electrical plug prong configured for insertion in an electrical power receptacle, a spring electrically and thermally coupled to said electrical plug prong, and a joinder element holding said spring against said electrical power conductor, said joinder element having a melting temperature approximately equal to said predetermined maximum safe temperature rating.

10. A circuit as claimed in claim 9 wherein:

said electrical power conductor is a first electrical power conductor, said spring is a first spring, said electrical plug prong is a first electrical plug prong, and said joinder element is a first joinder element;

said circuit additionally comprises a second electrical power conductor surrounded by insulation having substantially said predetermined maximum safe temperature rating, and said second electrical power conductor being associated with said first electrical power conductor in a circuit; and said thermal tracking plug additionally comprises a second electrical plug prong configured for insertion in an electrical power receptacle, a second spring electrically and thermally coupled to said second electrical plug prong, and a second joinder element holding said second spring against said second electrical power conductor, said second joinder element having a melting temperature approximately equal to said predetermined maximum safe temperature rating.

11. A circuit as claimed in claim 9 wherein:

said electrical power conductor is of a gauge and composition configured to exhibit a predetermined temperature increase when conducting a predetermined amount of electrical current;

said spring is of a composition and is dimensioned so that said spring exhibits approximately said predetermined temperature increase when conducting said predetermined amount of electrical current; and said joinder element is of a composition and is dimensioned so that said joinder element exhibits approximately said predetermined temperature increase when conducting said predetermined amount of current.

12. A circuit as claimed in claim 9 wherein said joinder element has a liquidus temperature less than 150° F. and a solidus temperature greater than 133° F.

13. A circuit as claimed in claim 9 wherein said joinder element comprises a composition of greater than 40% bismuth, less than 30% lead, and less than 15% tin.

14. A circuit as claimed in claim 9 wherein:

said electrical power conductor and said joinder element exhibit first and second conductivities, respectively, with said second conductivity being less than 20% of said first conductivity;

said electrical power conductor is of a gauge which causes said electrical power conductor to exhibit a predetermined temperature increase when conducting a predetermined amount of electrical current; and said joinder element is dimensioned to exhibit substantially said predetermined temperature increase when conducting said predetermined amount of electrical current.

15. A circuit as claimed in claim 9 wherein said spring comprises an alloy which is greater than 0.25% beryllium and between 0.45% and 0.65% combined nickel, cobalt and iron.

16. A circuit as claimed in claim 9 wherein:

said electrical power conductor and said spring exhibit first and second conductivities, respectively, with said second conductivity being less than 70% of said first conductivity;

said electrical power conductor is of a gauge which causes said electrical power conductor to exhibit a predetermined temperature increase when conducting a predetermined amount of electrical current; and said spring is dimensioned to exhibit substantially said predetermined temperature increase when conducting said predetermined amount of electrical current.

17. A thermally protected electrical power distribution circuit comprising:

an electrical power conductor surrounded by insulation having a predetermined maximum safe temperature rating, said electrical power conductor being of a gauge and composition configured to exhibit a predetermined temperature increase when conducting a predetermined amount of electrical current;

a spring of a composition and dimensioned so that said spring exhibits approximately said predetermined temperature increase when conducting said predetermined amount of electrical current; and a joinder element holding said spring against said electrical power conductor, wherein said joinder element is of a composition and is dimensioned to exhibit approximately said predetermined temperature increase when conducting said predetermined amount of current, and has a liquidus temperature less than 150° F. and a solidus temperature greater than 133° F.

18. A circuit as claimed in claim 17 additionally comprising:

a plug body surrounding a portion of said conductor, said spring, and said joinder element; and a plug prong electrically and thermally coupled to said spring, said plug prong extending outside said plug body and being configured for insertion in an electrical power receptacle.

19. A thermally protected electrical power distribution circuit comprising:

an electrical power conductor surrounded by insulation having a predetermined maximum safe temperature rating, wherein said electrical power conductor exhibits a first conductivity, and is of a gauge and composition configured to exhibit a predetermined temperature increase when conducting a predetermined amount of electrical current;

a spring of a composition and dimensioned so that said spring exhibits approximately said predetermined temperature increase when conducting said predetermined amount of electrical current; and a joinder element holding said spring against said electrical power conductor, wherein said joinder element exhibits a second conductivity less than 20% of said first conductivity, is of a composition and dimensioned to exhibit substantially said predetermined temperature increase when conducting said predetermined amount of electrical current.

* * * * *

UNITED STATES PATENT AND TRADEMARK OFFICE

CERTIFICATE OF CORRECTION

PATENT NO. : 6,603,385 B2
DATED : August 5, 2003
INVENTOR(S) : James L. Kitchens It is certified that error appears in the above-identified patent and that said Letters Patent is hereby corrected as shown below:

Column 3,
Lines 38-43, delete complete paragraph

Column 9,
Line 9, delete "TACS" and insert -- IACS -- therefor.

Column 12,
Line 13, delete "TACS" and insert -- IACS -- therefor.

Signed and Sealed this

Twenty-fifth Day of November, 2003

JAMES E. ROGAN
*Director of the United States Patent and Trademark Office*